July 8, 1941.  M. B. RASMUSSON  2,248,643
APPARATUS FOR ENROBING FROZEN CONFECTIONERY PRODUCTS WITH
CHOPPED NUTS AND SIMILAR SUBSTANCES
Filed April 10, 1940   3 Sheets-Sheet 1
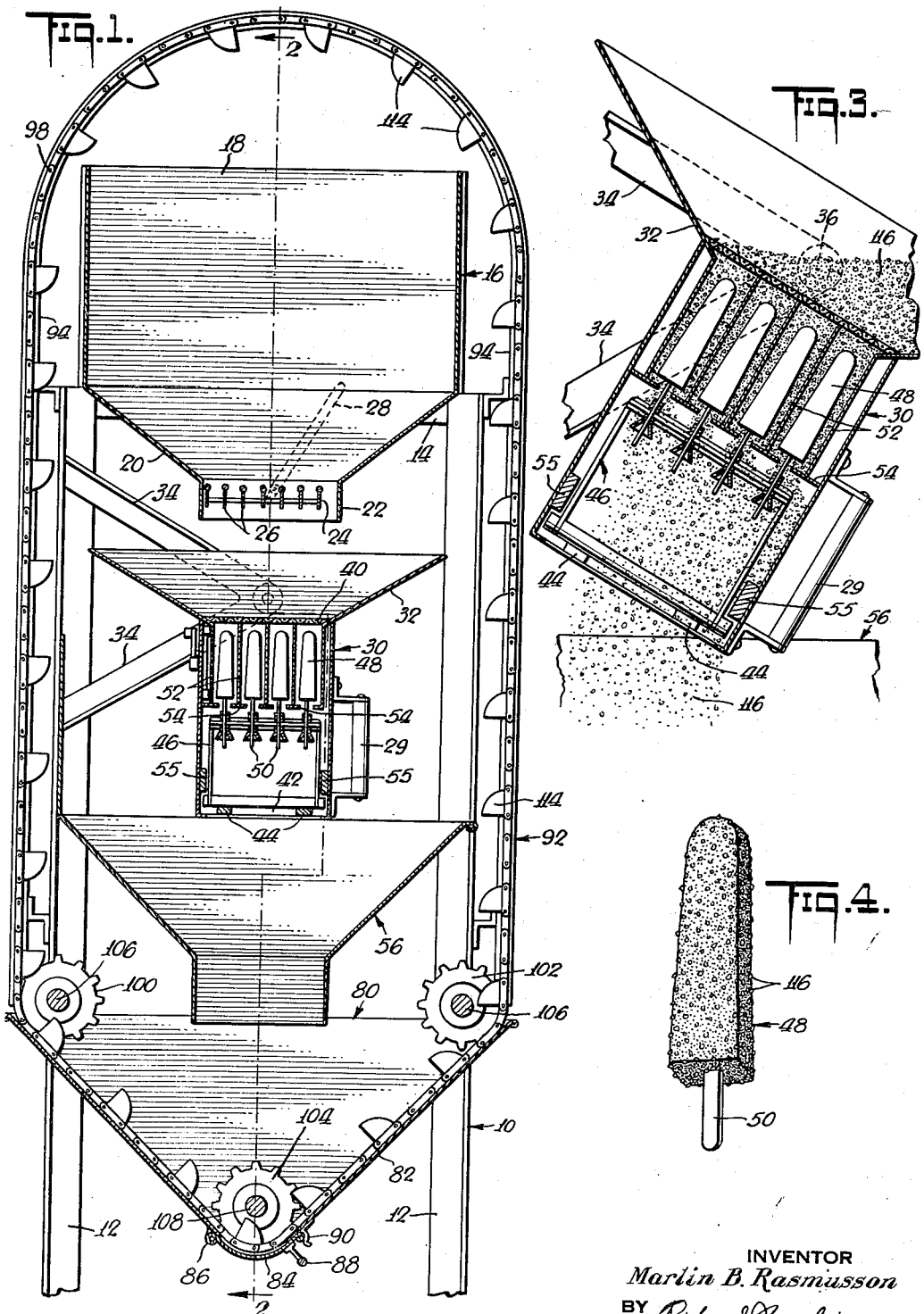
INVENTOR
Martin B. Rasmusson
BY Richard Newling
ATTORNEY

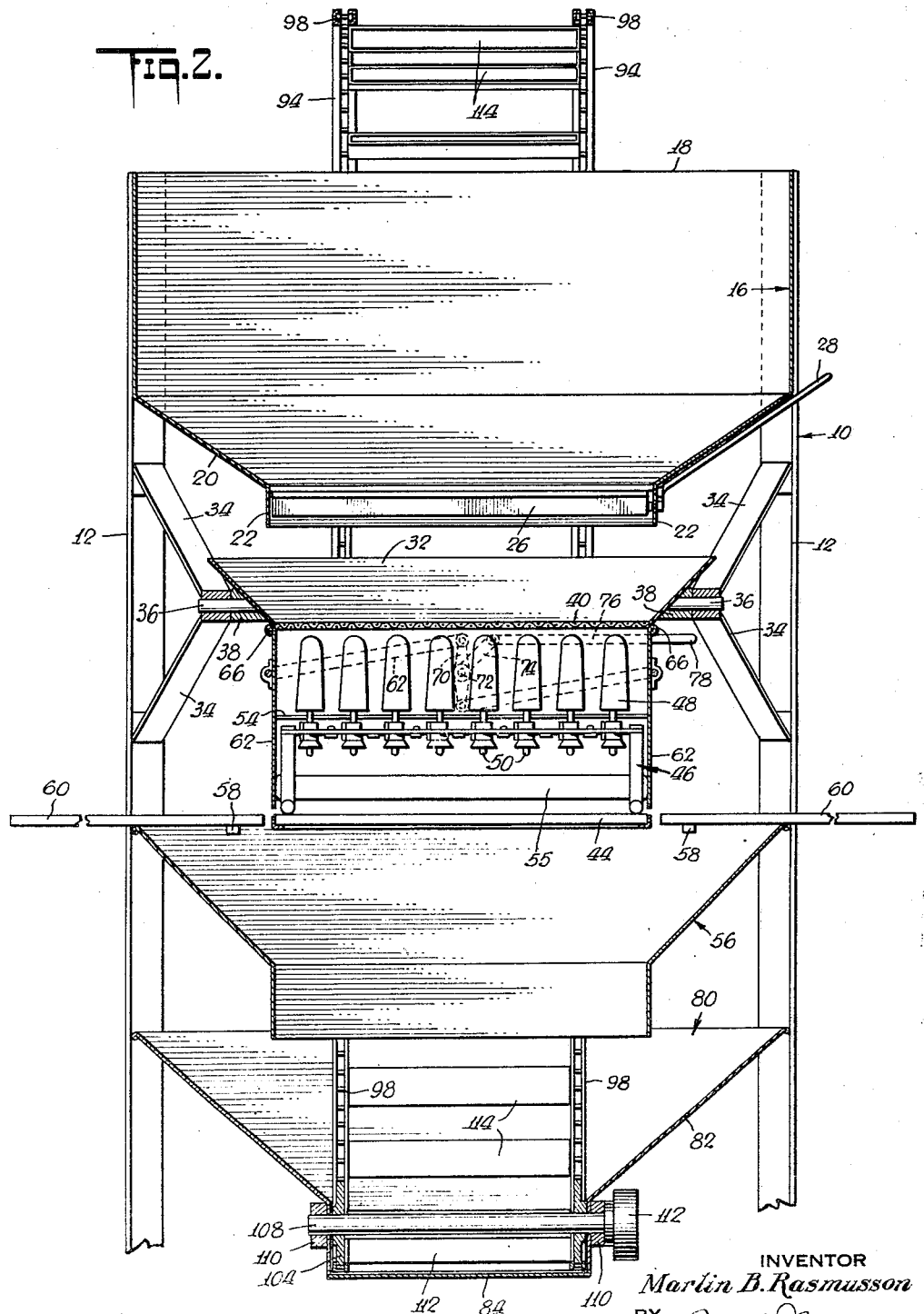

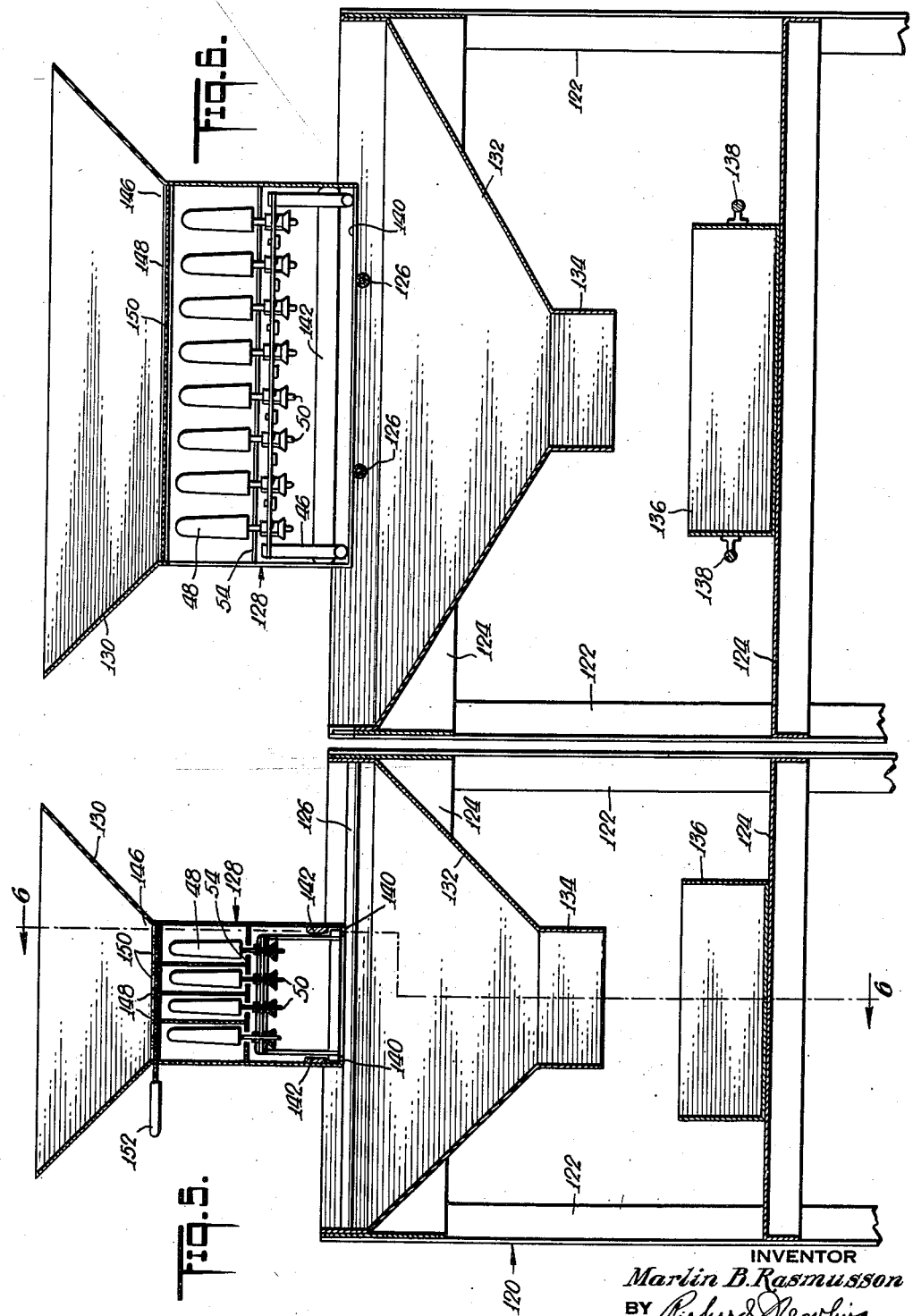
July 8, 1941.     M. B. RASMUSSON     2,248,643
APPARATUS FOR ENROBING FROZEN CONFECTIONERY PRODUCTS WITH
CHOPPED NUTS AND SIMILAR SUBSTANCES
Filed April 10, 1940     3 Sheets-Sheet 3
INVENTOR
Marlin B. Rasmusson
BY
ATTORNEY Patented July 8, 1941

2,248,643

UNITED STATES PATENT OFFICE 2,248,643

APPARATUS FOR ENROBING FROZEN CONFECTIONERY PRODUCTS WITH CHOPPED NUTS AND SIMILAR SUBSTANCES

Marlin B. Rasmusson, Los Angeles, Calif., assignor to Joe Lowe Corporation, New York, N. Y., a corporation of Delaware Application April 10, 1940, Serial No. 328,846

14 Claims. (Cl. 107—1)

The present invention relates to an apparatus for coating confectionery products, and it has particular relation to an apparatus for simultaneously enrobing a plurality of frozen confectionery products with a coating of finely chopped nut meats or similar comminuted farinaceous substances.

Heretofore, it has been customary to first dip the confectionery products in a sticky liquid substance, such as molten chocolate, and before the substance could dry or harden into a brittle, non-smearing outer protective coating, roll each individual confection in a quantity of finely chopped nut meats or similar substances. Another way practiced, was to apply the chopped nut meats by hand, sprinkling them over each individual frozen confectionery product. These methods were too laborious, however, for use in a modern frozen confectionery plant where large quantities of confectionery products are made. The present invention obviates the disadvantages of the former unsanitary manual methods of enrobing confectionery products with chopped nut meats or other finely comminuted farinaceous materials, and provides an apparatus which may be installed conveniently over a continuous conveyor system, and which is capable of applying or enrobing simultaneously a plurality of such confectionery products with finely chopped nut meats or similar substances.

An object of the present invention is to provide a new, simple and inexpensive apparatus which is capable of coating or enrobing a plurality of confectionery products with finely comminuted farinaceous material in a most efficient and economical manner.

A further object of the invention is the provision of an apparatus of the character described which is adapted to be used in conjunction with a conveyor operation without requiring expensive installation or disruption of existing plant operations.

Another object of the invention is to provide a new and inexpensive enrobing apparatus that is highly sanitary, and permits the enrobing of a plurality of confectionery products simultaneously without requiring any of the edible materials to be handled by the operator.

Other and further objects and advantages of the invention reside in the detailed description of the apparatus, which result in simplicity, economy and efficiency, and which will be apparent from the following description, wherein several preferred embodiments are shown, reference being had to the accompanying drawings, forming a part hereof, wherein like numerals indicate like parts, in which:

Fig. 1 is a side elevational view of an apparatus made in accordance with the invention;

Fig. 2 is a vertical sectional view of the apparatus shown in Fig. 1, the same being taken substantially along the line 2—2 thereof, looking in the direction of the arrows;

Fig. 3 is an enlarged sectional view of the enrobing chamber, illustrating the manner in which the finely comminuted enrobing material is discharged or sprinkled by gravity over a plurality of confectionery products;

Fig. 4 is an enlarged perspective view of a finished frozen confectionery product, showing the manner in which the same has been enrobed or coated with chopped nut meats or other finely divided farinaceous material;

Fig. 5 is a vertical sectional view of a modified form of apparatus which requires the finely divided enrobing material to be returned manually to the discharging hopper; and Fig. 6 is a vertical sectional view of the apparatus shown in Fig. 5, the same being taken substantially along the line 6—6 thereof, looking in the direction of the arrows.

Referring now to the drawings, wherein like figures indicate like parts, and particularly to Figs. 1 to 4 thereof, there is shown a semi-automatic apparatus embodying the principles of my invention. In Fig. 1 there is shown a supporting structure 10 consisting of four spaced upright supporting members 12, suitably connected by horizontal cross-members 14. Mounted adjacent the top of said supporting structure 10 is a storage chamber 16, having an open top 18 and a funnel shaped bottom 20 terminating in a narrow rectangularly shaped discharging outlet 22. Means are provided within said outlet 22, as indicated at 24, for opening and closing the same, said means consisting of a plurality of pivotally mounted shutter members 26 operated by a handle 28.

An enrobing chamber 30, having a funnel shaped receiving receptacle 32 mounted thereabove, is positioned immediately below the bottom of the discharging outlet 22 of the storage chamber. The enrobing chamber 30 and its funnel shaped receiving receptacle 32 are suitably suspended pivotally to the supporting structure 10 by means of a pair of V-shaped angular projecting arms 34 having rotatable stub shafts 36 (see Fig. 2) journaled in blocks 38 welded or otherwise securely fastened to the sides thereof. A screen or perforated plate 40 is positioned across the bottom of the receiving receptacle 32 to break up the discharging comminuted enrobing material falling into said receptacle to cause the same to fall in a sprinkle over the confectionery products in enrobing chamber 30. The enrobing chamber 30, which is integrally formed with the receiving receptacle 32, is open at the bottom, as indicated at 42, and is provided with spaced track members 44 for holding a conventional stickholder 46 in inverted position thereon, thereby causing its frozen confectionery products 48 which are fixedly spaced therein by means of their handle members 50, to extend upwardly toward the sprinkling screen 40.

A series of laterally spaced, longitudinally extending vertical baffle or deflecting plates 52 (see Fig. 2) extend downwardly from the screen or plate 40, and each is provided with a laterally extending horizontal deflecting plate 54. It will be noted that there is sufficient space between the horizontal deflecting plates 54 to permit the passage of the handle members 50 of the frozen confectionery products 48 therebetween. The opposite ends of the enrobing chamber are provided with doors 62, which are pivotally mounted adjacent the top, as indicated at 66. The doors 62 are connected by levers 68 to a suitable pivotal link member 70, which is mounted on a stub shaft 72 fastened to one side of the enrobing chamber 30. The link member 70 is in turn connected by a series of levers 74 and 76 to a handle 78 extending outside of the enrobing chamber 30 adjacent one end thereof. A manipulating handle, to facilitate shaking of the enrobing chamber with respect to the supporting structure, is mounted, as indicated at 29, to the opposite side thereof. The blocks 55 mounted on the inner sides of the enrobing chamber are merely to guide and space the stickholder 46 to align the rows of handle members 50 with the openings between the spaced horizontal deflecting plate 54.

A funnel shaped collector 56 is mounted between the uprights 12 immediately below the tracks 44 of the enrobing chamber by spot-welding or any other suitable fastening means. Spaced supporting rods 58 are mounted transversely of the collector 56 to receive and support the projecting ends of the conveyor tracks 60, which may be employed to deliver the stickholders 46 and their confectionery products 48 to the enrobing chamber 30, and remove the finished enrobed confectionery products 48 therefrom. Obviously, if the apparatus is not to be installed in a conveyor operating system, the tracks 60 need not be connected to the apparatus, and the filled stickholders 46 may be manually positioned and removed from the tracks 44 enrobing chamber 30.

Receiving means 80 is mounted between the uprights 12 adjacent the bottom of the supporting structure 10, and is provided with downwardly and inwardly sloping sides 82. A trap or clean-out door 84 is provided at the bottom of the receiving means to facilitate cleaning and removing any comminuted enrobing substances collected therein. The door 84 is hinged, as indicated at 86, and has a handle 88 at the opposite end thereof for manipulating the same. A snap catch 90 is also provided to lock the door 84 in closed position when the apparatus is being used.

A conveyor 92 is provided for removing the enrobing material from the receiving means 80 and returning the same to the storage chamber 16. Inverted U-shaped channel iron frame members 94 are mounted in longitudinal spaced relation intermediate the ends of the supporting structure 10 in any suitable manner, as by spot-welding, riveting or bolting. A pair of endless chains 98 are mounted over said U-shaped frame members 94, and are guided over a series of pairs of sprocket wheels 100, 102 and 104. The pairs of sprocket wheels 100 and 102 are mounted freely on shafts 106 suitably journaled in bearings (not shown) mounted on the uprights 12 of the supporting structure. The pair of sprocket wheels 104 are suitably keyed to the shaft 108 which in turn is journaled to bearing blocks 110 mounted on the sides of the receiving means 80. A pulley wheel 112 is keyed to the end of the shaft 108, which extends beyond the bearing block 110 for connecting the conveyor mechanism to a suitable source of operating power. A series of buckets 114 are mounted between the chains 98 for conveying the enrobing material from the receiver 80 to the storage chamber 16.

In operation of the semi-automatic apparatus shown in Figs. 1 to 4, it will be assumed that the storage chamber 16 is filled with finely chopped nut meats or other suitable comminuted farinaceous substances, and that the endless conveyor 92 is in full operation. A stickholder 46 containing a plurality of frozen confectionery products 48, which have just been defrosted from their freezing molds (not shown) is positioned on the tracks 44 in the enrobing chamber 30. Upon defrosting the sides of the confectionery products 48, they become wet due to melting during the defrosting operation, and it takes several minutes for such surfaces to dry or refreeze from the latent refrigeration in the frozen main body portion. It is during this period that the confectionery products 48 are enrobed by means of the apparatus herein described. The end doors 62 of the enrobing chamber are closed by means of the operating handle 78 to prevent the enrobing material from being discharged therefrom.

The handle 28 operating the shutter members 26 in the discharging outlet 22 of the storage chamber 16 is moved to its open position, and a quantity of the comminuted enrobing material gravitates therethrough into the receiving receptacle 32 in the form of a shower as shown in Fig. 3. The enrobing material upon passing through the screen or plate 40 is broken up and retarded somewhat so that it will pass into the enrobing chamber 30 in the form of a sprinkle of material. The enrobing chamber 30, being pivotally suspended from the V-shaped arms 34 on the stub shafts 36, may be shaken manually by means of the manipulating handle 29 while the enrobing material is sprinkling therethrough. The baffle plates 52 cause the falling material to be deflected against the wet sides of the confectionery products, and the horizontal plates 54 catch sufficient falling material to cover the bottom surface thereof, which material is thrown into contact with the bottom surface thereof by bouncing upon falling and by the shaking of the enrobing chamber 30 in various directions by means of the handle 29. I have found that in this manner sufficient coating material 116 adheres to the outer surfaces of the confectionery products, as best shown by the finished coated product illustrated in Fig. 4.

With the bottom of the enrobing chamber 30 being open, the excess material falling therethrough is caught by the funnel-shaped collector 56 and delivered to the receiver 80 where it is picked up by the conveyor buckets 114 and transported up to and dumped back into the storage chamber 16. It will be noted that the open top collector 56 extends over the entire space between the uprights 12, which prevents any falling enrobing material to be lost during the shaking of the enrobing chamber 30. When the confectionery products 48 have been completely enrobed, as shown in Fig. 4, the discharging openings in the outlet 22 of the storage chamber 16 may be closed manually by the handle 28, the end doors 62 of the enrobing chamber 30 opened and the stickholder 46 and contents 48 withdrawn through the opposite end thereof onto the opposite section of the conveyor tracks 60, thereby passing in one direction entirely through the enrobing chamber 30.

In the modified form of apparatus shown in Figs. 5 and 6, the apparatus is operated entirely by hand. In this modification, I provide a supporting structure 120, consisting of four spaced uprights 122, suitably braced with horizontal supporting members 124. Adjacent the top of the supporting structure 120, which is of standard table height, I have mounted a pair of spaced freely rotatable supporting shafts 126 for receiving and supporting a separable enrobing chamber 128 and storage chamber 130 of integral construction.

Also adjacent the top of said supporting structure 120 and immediately below the shafts 126, I propose to mount a funnel-shape collector 132, having a downwardly extending reduced discharging outlet 134. On the lower horizontal bracing member 124 and immediately below the outlet 134, is removably mounted a receiver 136 which consists substantially of an open top drawer or bin provided with handles 138 at opposite ends thereof to facilitate handling.

Mounted on the top of the shafts 126 is an enrobing chamber 128 having an open bottom except for the tracks 140 for holding the stickholder 46 containing a plurality of confectionery products 48, by means of their handle members 50. The blocks 142 mounted on the inner sides of the enrobing chamber adjacent the tracks 140 thereof are merely spacing blocks for the stickholder 46 to facilitate aligning the rows of handle members 50 with the slots between the horizontal deflecting plates 54. In this modification the open top storage chamber 130 is integrally formed with the enrobing chamber 126, and the discharging outlet 146 is closed and opened by means of a pair of slotted plates 148 and 150. The plate 148 is fixedly mounted in the outlet 146, and the plate 150 is slidably mounted in juxtaposition therewith, and is provided with a manipulating handle member 152.

In operating this modified apparatus shown in Figs. 5 and 6, the outlet 146 is closed in the bottom of the storage chamber 144 by moving the handle member 152 so that the slots in the plates 148 and 150 are out of alignment. The storage chamber 144 is now ready to receive a quantity of enrobing material (not shown) such as finely chopped nut meats or other suitable comminuted farinaceous substance. A stickholder 46 containing a plurality of wet defrosted confectionery products 48 is manually positioned on the tracks 140 in the enrobing chamber 128. The handle member 152 is now moved so that the slots in the plates 148 and 150 are in alignment, which permits a shower of enrobing material to fall by gravity over the confectionery products 48 in the enrobing chamber 128. To facilitate bringing the enrobing material into contact with the surfaces of the confectionery products, the entire chamber structure may be rolled, tilted and manually shaken on the shafts 126. The material passing through the open bottom of the enrobing chamber 128 will fall into the collector 132, and thereby delivered to the receiver 136 positioned therebelow. When the confectionery products 48 in the enrobing chamber 128 are completely coated, the discharge outlet 146 of the storage chamber 130 is closed, which prevents further enrobing material to gravitate into the enrobing chamber 128. When all of the discharged material has passed into the receiver 136, it may be manually removed from its supporting member 124, and the contents dumped back into the open top of the storage chamber 144.

It will be apparent that with the apparatus shown in the drawings, embodying either form of construction, a goodly portion of the enrobing substance 116 coming into contact with the wet surfaces of the confectionery products 48, will have a tendency to adhere thereto, and, as the surfaces become dry or refrozen by the latent refrigeration in the frozen body portion, such particles as remain in contact therewith will become firmly bonded thereto by congelation.

Although I have described in detail only two modifications which my invention may assume, it will be apparent to those skilled in the art that the invention is not so limited, but that various other modifications may be made therein without departing from the spirit thereof or from the scope of the appended claims.

What I claim is:

1. In a machine of the character described, a supporting structure, a storage chamber adapted to be positioned adjacent the top thereof for receiving a quantity of comminuted enrobing substance, said storage chamber having a discharge outlet at the bottom thereof, an enrobing chamber which is open at the top and bottom for receiving and holding a plurality of confectionery products below the discharge outlet of said storage chamber, said enrobing chamber being movable with respect to the supporting structure, and a receiving hopper mounted below said enrobing chamber for receiving the excess enrobing substance passing through said enrobing chamber.

2. In a machine of the character described, a supporting structure, a storage chamber adapted to be positioned adjacent the top thereof for receiving a quantity of comminuted enrobing substance, said storage chamber having means at the bottom thereof for discharging the enrobing substance therefrom when desired, an enrobing chamber which is open at the top and bottom for receiving and holding a plurality of confectionery products in position below the discharging means of said storage chamber, said enrobing chamber being movable with respect to the supporting structure, collecting means mounted on said supporting structure immediately below said enrobing chamber for collecting any excess enrobing substances passing therethrough, and receiving means positioned below said collecting means for receiving the excess substance collected by said collecting means.

3. In a machine of the character described, a supporting structure, a storage chamber mounted adjacent the top thereof having a discharging outlet at the bottom thereof, means for opening and closing said outlet, an enrobing chamber which is open at the top and bottom for receiving and holding a plurality of confectionery products, laterally spaced means interposed intermediate the sides of said chamber and extending below the bottoms of said confections for impeding the gravitation of the enrobing substance therethrough and deflecting the same onto said confectionery products, said enrobing chamber being movable with respect to the supporting structure, collecting means mounted on said supporting structure below said enrobing chamber for collecting any enrobing substance passing through the latter, and receiving means mounted below said collecting means for receiving the excess substance discharged by said collecting means.

4. In a machine of the character described, a supporting structure, a storage chamber mounted adjacent the top thereof having a discharging outlet at the bottom thereof, means for opening and closing said outlet, an enrobing chamber which is open at the top and bottom for receiving and holding a plurality of confectionery products, longitudinally extending vertical and horizontal means spaced laterally intermediate the sides of said chamber for impeding the gravitation of the enrobing substance therethrough and deflecting the same onto the sides and bottom of said confectionery products, said enrobing chamber being movable with respect to the supporting structure, collecting means mounted on said supporting structure below said enrobing chamber for collecting any enrobing substance passing therethrough, and receiving means mounted below said collecting means for receiving the excess substances discharged by said collecting means.

5. In a machine of the character described, a supporting structure, a storage chamber adapted to be positioned adjacent the top thereof for receiving a quantity of comminuted substance for gravitation discharge, means positioned adjacent the bottom of said storage chamber for discharging the contents therefrom, an open top and bottom enrobing chamber slidably mounted below said discharging means for holding a plurality of confectionery products to be enrobed, collecting means mounted below said enrobing chamber for catching any enrobing substance passing therethrough, receiving means positioned below said collecting means for receiving the discharged substance therefrom, and means for returning the substance from said receiving means to the storage chamber.

6. In a machine of the character described, a supporting structure, a storage chamber adapted to be positioned adjacent the top thereof for receiving a quantity of comminuted substance for gravitation discharge, means positioned adjacent the bottom of said storage chamber for discharging the contents therefrom, an open top and bottom enrobing chamber having means for receiving and holding a plurality of confectionery products, which permits the enrobing substance to pass therethrough, said chamber having means laterally spaced therethrough for deflecting the enrobing substance onto the confectionery products positioned therein and being movable with respect to said supporting structure, collecting means mounted below said enrobing chamber for catching any enrobing substance passing therethrough, receiving means positioned below said collecting means for receiving the collected substance therefrom, and means for returning the substance from said receiving means to the storage chamber.

7. In a machine of the character described, a supporting structure, a storage chamber adapted to be positioned adjacent the top thereof for receiving a quantity of comminuted substance for gravitation discharge, means positioned adjacent the bottom of said storage chamber for discharging the contents therefrom, an open top and bottom enrobing chamber having means for receiving and holding a plurality of confectionery products, which permits the enrobing substance to pass therethrough, said chamber having means laterally spaced therethrough for deflecting the enrobing substance onto the confectionery products positioned therein and being movable with respect to said supporting structure, collecting means mounted below said enrobing chamber for catching any enrobing substance passing therethrough, receiving means positioned below said collecting means for receiving the collected substance therefrom, and a continuous conveyor mechanism for returning the substance from said receiving means to the storage chamber.

8. In a machine of the character described, a supporting structure, a storage chamber adapted to be positioned adjacent the top thereof for receiving a quantity of comminuted substance for gravitation discharge, said storage chamber having a downwardly sloping bottom provided with a reduced discharging outlet, said outlet having means mounted therein for opening and closing the same, a funnel-shaped receiver suspended freely below said outlet for receiving the comminuted substance discharged therefrom, said receiver having an open top and bottom enrobing chamber mounted therebelow for holding a plurality of confectionery products to be enrobed, said chamber having impeding means adjacent the open top thereof for causing said comminuted substance to be sprinkled over said confections contained therein, a funnel shaped collector mounted between the supports of said supporting structure for receiving any comminuted substance passing through said enrobing chamber, a receiver having downwardly sloping sides for receiving the comminuted substance from said collector, and conveyor means for returning the substance in the receiver to the storage chamber.

9. In a machine of the character described, a supporting structure, a storage chamber adapted to be positioned adjacent the top thereof for receiving a quantity of comminuted substance for gravitation discharge, said storage chamber having a downwardly sloping bottom provided with a reduced discharging outlet, said outlet having means mounted therein for opening and closing the same, a funnel-shaped receiver suspended freely below said outlet for receiving the comminuted substance discharged therefrom, said receiver having an open top and bottom enrobing chamber mounted therebelow for holding a plurality of confectionery products to be enrobed, said chamber having horizontal means adjacent the open top thereof for causing said comminuted substance to be sprinkled evenly over the confectionery products contained therein and having laterally spaced longitudinally extending horizontal and vertical means for deflecting said substances directly against said confectionery products, a funnel-shaped collector mounted between the supports of said supporting structure for receiving any comminuted substance passing through said enrobing chamber, a receiver having downwardly sloping sides for receiving the comminuted substance from said collector, and conveyor means for returning the substance in the receiver to the storage chamber.

10. In a machine of the character described, a supporting structure, a storage chamber adapted to be positioned adjacent the top thereof for receiving a quantity of comminuted substance for gravitation discharge, said storage chamber having a downwardly sloping bottom provided with a reduced discharging outlet, said outlet having means mounted therein for opening and closing the same, a funnel-shaped receiver suspended freely below said outlet for receiving the comminuted substance discharged therefrom, said receiver having an open top and bottom enrobing chamber mounted therebelow for holding a plurality of confectionery products to be enrobed, means mounted on said enrobing chamber for shaking the same with respect to said supporting structure, a funnel-shaped collector mounted between the supports of said supporting structure for receiving any comminuted substance passing through said enrobing chamber, a receiver having downwardly sloping sides for receiving the comminuted substance from said collector, and conveyor means for returning the substance in the receiver to the storage chamber.

11. In a machine of the character described, an open top supporting structure having means adjacent the top thereof for supporting an enrobing chamber, a separable enrobing chamber open at the top and bottom for receiving and holding a plurality of confectionery products, a storage chamber integrally formed with said enrobing chamber and extending thereabove, means mounted adjacent the bottom of said storage chamber for discharging comminuted substance therefrom when desired, a collector mounted on said supporting structure below said supporting means for collecting substances passing through said enrobing chamber, and a removable receiver positioned below said collector for receiving the substances from said collector.

12. In a machine of the character described, an open top supporting structure having rotatable means adjacent the top thereof for receiving and supporting an enrobing chamber, a funnel-shaped collector mounted on said supporting structure below said rotatable supporting means for collecting substances passing out of the bottom of said enrobing chamber, a removable receiver mounted on said supporting structure below said collector for receiving the collected substances therefrom.

13. As a new element in a machine of the character described, a funnel-shaped storage chamber having an enrobing chamber mounted therebelow, means adjacent the bottom of said storage chamber for opening and closing the same to discharge material therefrom into said enrobing chamber, means mounted adjacent the open bottom of said enrobing chamber for receiving and holding a plurality of confectionery products, said enrobing chamber having laterally spaced means extending longitudinally thereof for deflecting material discharged from said storage chamber against said confectionery products.

14. As a new element in a machine of the character described, an open top funnel-shaped storage chamber having means mounted adjacent the bottom thereof for opening and closing the same, an integrally formed open bottom enrobing chamber mounted therebelow having means for receiving and holding a plurality of confectionery products therein, said enrobing chamber having spaced vertical and horizontal means for deflecting substances discharged from said storage chamber against said confectionery products.

MARLIN B. RASMUSSON.